United States Patent
Coakley et al.

(10) Patent No.: US 6,332,541 B1
(45) Date of Patent: Dec. 25, 2001

(54) PARTICLE MANIPULATION

(75) Inventors: William Terence Coakley; Jeremy John Hawkes; David Anthony Barrow, all of Cardiff; Joseph Cefai, Swansea, all of (GB)

(73) Assignee: University College Cardiff Consultants Ltd, Cardiff (GB)

( * ) Notice: Subject to any disclaimer, the term of this patent is extended or adjusted under 35 U.S.C. 154(b) by 0 days.

(21) Appl. No.: 09/423,253

(22) PCT Filed: Apr. 30, 1998

(86) PCT No.: PCT/GB98/01274

§ 371 Date: Jan. 20, 2000

§ 102(e) Date: Jan. 20, 2000

(87) PCT Pub. No.: WO98/50133

PCT Pub. Date: Nov. 12, 1998

(30) Foreign Application Priority Data

May 3, 1997 (GB) .................................................. 9708984

(51) Int. Cl.[7] .................................................. B01D 43/00
(52) U.S. Cl. .............................................. 209/18; 209/160
(58) Field of Search ............................. 209/18, 590, 156, 209/158, 160; 210/748

(56) References Cited

U.S. PATENT DOCUMENTS

| 4,339,247 | * | 7/1982 | Faulkner et al. | 55/15 |
| 4,743,361 | * | 5/1988 | Schram | 209/1 |
| 4,759,775 | * | 7/1988 | Peterson et al. | 55/15 |
| 5,164,094 | * | 11/1992 | Stuckart | 210/708 |

FOREIGN PATENT DOCUMENTS

| 3218488 | * | 11/1983 | (DE) . |
| 0380194A1 | * | 8/1990 | (EP) . |
| 0773055A2 | * | 5/1997 | (EP) . |
| 2098498A | * | 11/1982 | (GB) . |
| 2 166 659 A | * | 5/1986 | (GB) . |
| 2166659A | * | 5/1986 | (GB) . |
| 2 297 279 A | * | 7/1996 | (GB) . |
| 2297279A | * | 7/1996 | (GB) . |
| WO95/34522 | * | 12/1995 | (WO) . |

OTHER PUBLICATIONS

IBM Technical Disclosure vol. 25, No. 1, Jun. 1982 discloses ultrasonic continuous flow plasmapheresis separator, p. 192–193.*

Article entitled "Enhanced synchronized ultrasonic and flow–field fractionation of suspensions" in Ultrasonics 1994, vol. 32, No.2, pp. 113–121.*

* cited by examiner

Primary Examiner—Donald P. Walsh
Assistant Examiner—Joseph C Rodriguez
(74) Attorney, Agent, or Firm—David P. Gordon; David S Jacobson; Thomas A Gallagher

(57) ABSTRACT

An apparatus which manipulates particles suspended in a fluid includes a duct for the flow of the fluid in which the particles are suspended, and a mechanism for establishing an acoustic standing wave field across the width of the duct, the duct being formed with an expansion in width downstream of the standing wave field. In use, the particles in the fluid are displaced into a series of parallel bands by the acoustic standing wave field. The particles remain in these bands as the fluid flows downstream from the section in which the standing wave field is present. When the fluid reaches the expansion of the duct, the stream of fluid expands accordingly in width and, in so doing, the bands of particles are spread further apart, so increasing the spacing between adjacent bands. The bands can then be observed or separated from the duct.

11 Claims, 2 Drawing Sheets

PARTICLE MANIPULATION

BACKGROUND OF THE INVENTION

1. Field of the Invention

The present invention relates to an apparatus and method for performing the manipulation of particles suspended in a fluid, using an acoustic standing wave field.

2. State of the Art

When particles suspended in a fluid are subjected to an acoustic standing wave field, the particles displace to the location of the standing wave nodes. The effectiveness of this process varies with the relative densities and compressibilities of the particles and the suspending fluid.

A number of techniques have been proposed, using this phenomenon, to separate particles from a liquid or other fluid. Typically, the fluid is caused to flow through a duct in which an acoustic standing wave field is established, transverse to the length of the duct. The particles accordingly displace to form a series of parallel bands, and then a number of outlet passages are provided to lead the individual bands of particles away from the main flow duct. Because there are engineering difficulties involved in providing a parallel array of narrow outlet passages to collect the particle bands, the tendency is to operate at relatively low frequencies, so that the wavelength of the standing wave field is sufficiently large to provide an adequate spacing between the particle bands (half-wavelength spacing).

The primary acoustic radiation force on a single particle in an acoustic standing wave field is proportional to the operating frequency. Also the distance which a particle needs to move to reach a node decreases with increasing frequency (because the wavelength is smaller and hence the spacing between nodes is smaller). It is therefore easier to concentrate particles (including biological cells) at higher operating frequencies. Ultrasonic cavitation is also less likely to limit the applicable acoustic pressure at higher frequencies. However, the use of higher frequencies, and therefore smaller wavelengths, increases the engineering difficulties involved in providing outlet passages for the individual particle bands. In some cases, instead of separating particles from the suspending fluid, it may be required to form the particles into their bands for the purpose of observation (e.g. for the purpose of an immuno-agglutination assay, as described in GB-2265004). For such cases, it will be appreciated that the particle bands are closer together at the higher frequencies, and therefore even more difficult to observe.

We have now devised an apparatus and method which overcome the difficulties noted above, and can be used whether the particles are to be separated from the suspending fluid or whether they are to be formed into their bands for observation purposes.

SUMMARY OF THE INVENTION

In accordance with the present invention, there is provided an apparatus for performing the manipulation of particles suspended in a fluid, the apparatus comprising a duct for the flow of a fluid in which particles are suspended, and means for establishing an acoustic standing wave field across the width of the duct, the duct being formed with an expansion in width downstream of the standing wave field.

In use of this apparatus, the particles in the fluid are displaced into a series of parallel bands by the acoustic standing wave field. The particles remain in these bands as the fluid flows downstream from the section in which the standing wave field is present. When the fluid reaches the expansion of the duct, the stream of fluid expands accordingly in width and in so doing the bands of particles are spread further apart, so increasing the spacing between adjacent bands.

In passing further along the duct, the particle bands retain their increased spacing. The bands can now either be observed, or they can be separated from the duct.

Preferably the duct includes an initial elongate section in which a laminar flow of the fluid is established, before the fluid enters the acoustic standing wave field.

The expansion of the duct is preferably formed by a section of the duct which progressively increases in width over the length of that section. Downstream of the expansion section, the duct preferably comprises an elongate section of uniform cross-section, in which the laminar flow of fluid is maintained.

It will be appreciated that by expanding the separation of the particle bands, these bands become substantially easier to observe and/or to separate from the fluid. Ultrasound of higher frequencies than hitherto can be used, preferably greater than 2 MHz. Preferably means are provided downstream of the expansion section for observing the particle bands, or for separating them from the main duct.

The duct may be formed with at least one outlet passage which extends outwardly at an inclined angle, thus forming the expansion in width of the duct. The fluid adjacent the side of the duct from which the outlet passage diverges, and outwardly of the adjacent band of particles, now passes out of the duct along the outlet passage.

Preferably each outlet passage is provided with a valve. When the valve is closed, all of the fluid passes along the duct, without widthwise expansion and corresponding increased separation of the particle bands. As the valve is progressively opened, progressively more of the fluid is able to flow through the outlet passage, so effectively increasing the expansion of the fluid stream and passing an increasing portion of that stream out from the main flow duct. Alternatively or in addition, each outlet passage may be provided with a pump the flow rate of which is independently adjustable.

Also in accordance with the present invention, there is provided a method of performing the manipulation of particles suspended in a fluid, the method comprising causing the fluid to flow along a flow duct, establishing an acoustic standing wave field transversely of the duct, and providing a widthwise expansion of the stream of fluid downstream of the standing wave field.

Embodiments of the present invention will now be described by way of examples only and with reference to the accompanying drawings.

DETAILED DESCRIPTION OF THE PREFERRED EMBODIMENT

Figure 1:
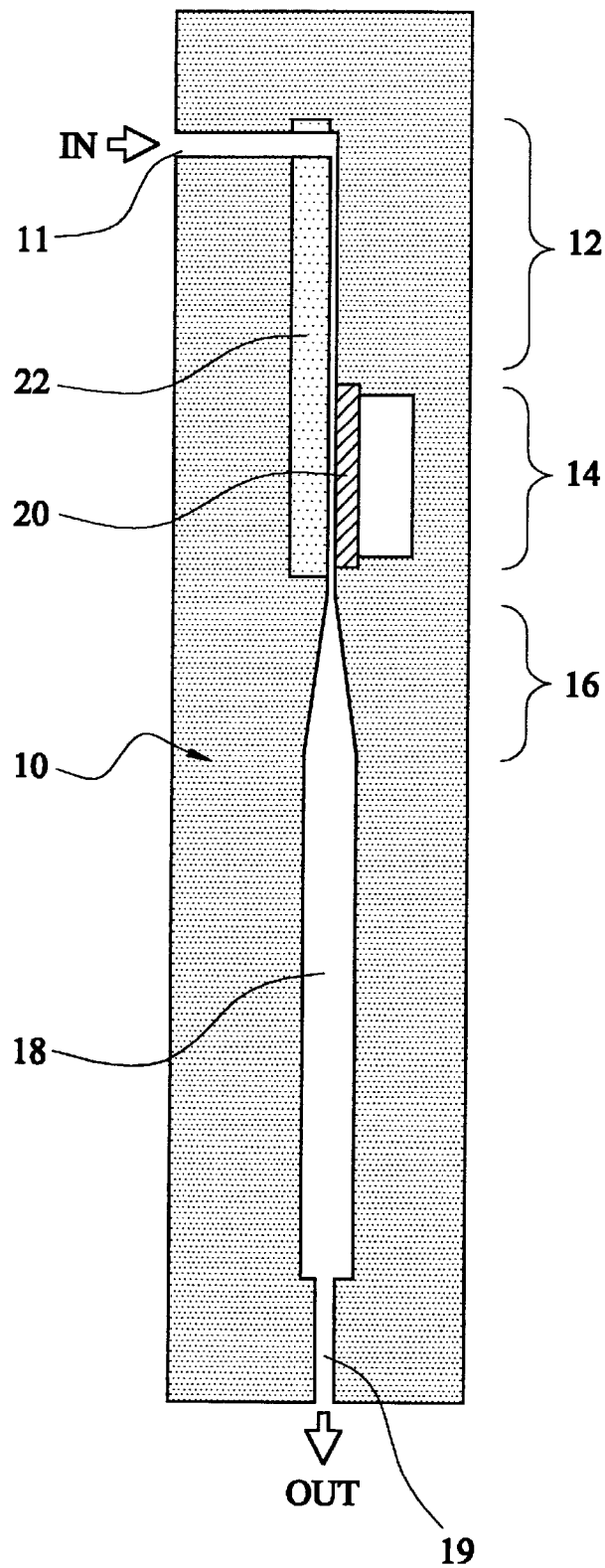
FIG. 1 is a diagrammatic longitudinal section through a first embodiment of an apparatus in accordance with the invention.

Referring to FIG. 1, there is shown an apparatus which comprises a body 10 formed with a longitudinal duct or chamber, the chamber having four successive sections. Firstly, a straight duct of uniform cross-section forms a laminar flow stabilization (first) section 12 and the acoustic standing wave (second) section 14. Next the duct expands in width, to form a stream expansion (third) section 16. Then the chamber comprises a straight duct 18 of uniform cross-section, to form an observation (fourth) section. An inlet passage 11 extends to the end of the first section 12 and an outlet passage 19 extends from the end of the observation section 18.

In the example shown, the duct forming the first two sections 12,14 has a rectangular cross-section of 1.1×10 mm: the first section 12 has a length of 40 mm and the second section has a length of 15 mm. The third section 16 is also of rectangular cross-section, but expands from an initial size of 1.1×10 mm to 8×10 mm over a length of 30 mm. The fourth section 18 of the chamber is of uniform rectangular cross-section, 8×10 mm, and 65 mm in length.

An acoustic standing wave field is established across the duct section 14 by a piezoelectric transducer 20 positioned on one side of the duct and a brass reflector 22 of 3 mm thickness positioned on the opposite side of the duct. The transducer 20 comprises an air-backed transducer of 2.5 cm diameter, type PZT 26 supplied by Ferroperm of Krisgard, Denmark, and having a fundamental resonant frequency near 3 MHz. The back electrode of the transducer has been etched to an area of 1×1.5 cm to restrict ultrasound generation to an area corresponding to the acoustic chamber.

Figure 2:
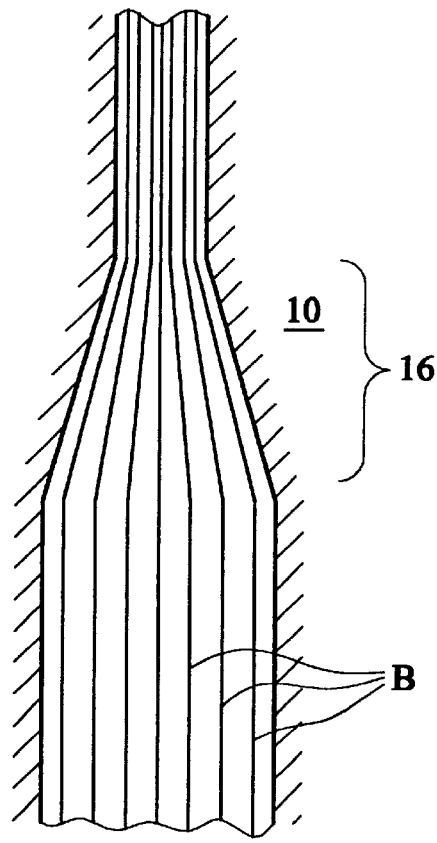
FIG. 2 is an enlarged diagrammatic view to show the manner in which the separation of the particle bands increases over the expansion section of the apparatus of FIG. 1.

In use, fluid with particles (which may be biological cells) in suspension is pumped through the chamber, preferably using a peristaltic pump. The first section 12 is sufficiently long to establish a stable laminar flow of the fluid. The acoustic standing wave field established in the second section of the chamber provides a number of nodal planes, spaced at half-wavelength intervals across the width of the chamber between the transducer 20 and the reflector 22. Accordingly, the suspended particles displace transversely to these nodal planes, thus forming the particles into a series of parallel planar bands. As the fluid flows further along the chamber and out of the acoustic standing wave field, the particles remain in these bands:

however, over the length of the expansion section 16 of the chamber, the bands B progressively separate, as shown in FIG. 2. Then in flowing through the final chamber section 18, the bands B remain parallel to each other and at the expanded separation achieved in the expansion section 16 of the chamber.

It will be appreciated that because of the increased spacing between the adjacent bands B, these bands are very much easier to observe. Observation is achieved through a transparent side wall of the final section 18 of the chamber, i.e. in a direction perpendicular to the plane of the paper on which FIG. 1 is drawn.

Figure 3:
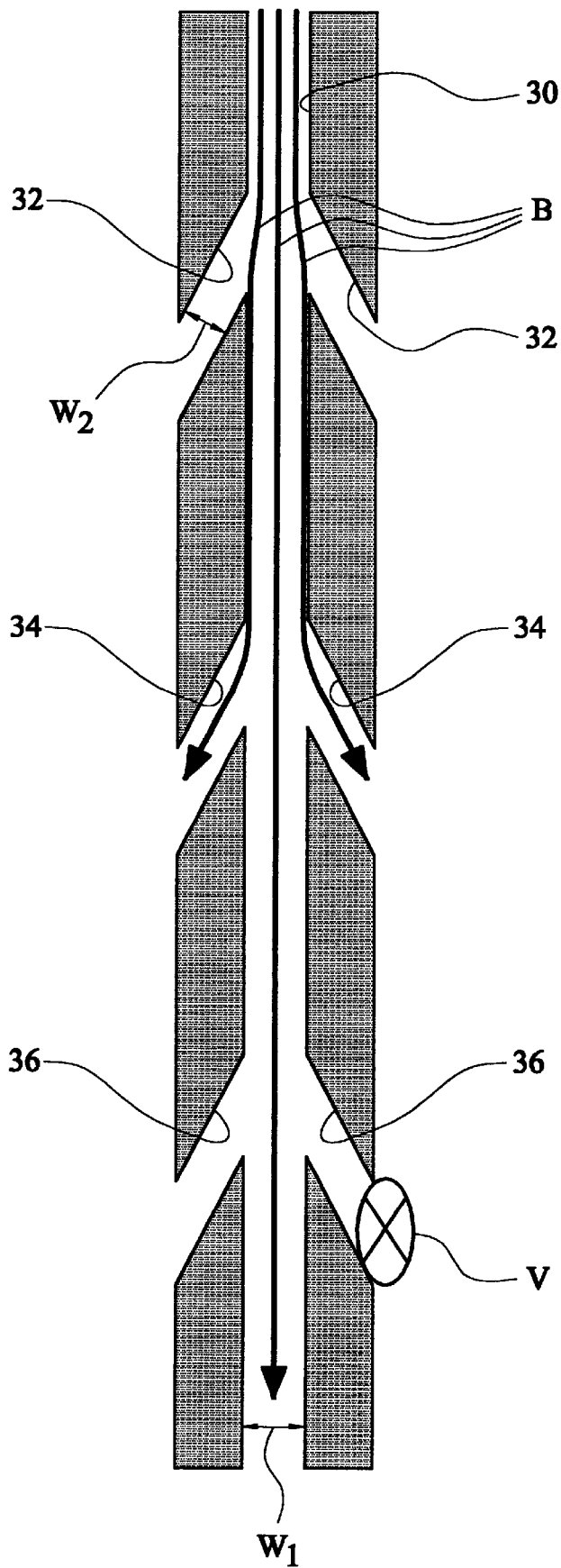
FIG. 3 is a diagrammatic longitudinal section of a second embodiment of the apparatus in accordance with the invention.

Alternatively or in addition, the principles of the invention may be employed for separating the particles from the fluid, for example in the manner shown in FIG. 3. A duct 30 is shown in which firstly a laminar flow of the fluid has been established and then the acoustic standing wave field, through which the fluid flows, causes the suspended particles to displace transversely and so form a series of parallel bands B. The section of duct 30 which is shown in FIG. 3 (and typically having a width $W_1$ of 1.6 mm) is formed with a pair of outwardly-inclined outlet passages 32 (typically having a width $W_2$ of 3 mm): these may be positioned at any desired longitudinal distance downstream from the acoustic standing wave field, because once formed into their bands B, the particles tend to remain in those bands for a considerable time. The outlet passages 32 form an expansion of the duct 30, causing the particle bands B to increase in separation. However the fluid outside the outer bands of particles now passes out of the duct 30, through the outlet passages 32.

In the example shown in FIG. 3, the duct 30 is formed with a second pair of outwardly-inclined outlet passages 34, at a position further downstream from the first pair of outlet passages 32. This second pair of outlet passages 34 forms another expansion of the duct 30, causing the outer particle bands to pass out of the duct 30 through the passages 34. A third pair of outlet passages 36 are provided yet further downstream from the second pair 34, to form a third expansion of the duct 30 and causing the fluid either side of the remaining particle band to pass out of the duct 30. FIG. 3 shows an arrangement in which three bands of particles are formed. However, it will be appreciated that in practice any number of bands may be formed (even just a single band), depending on the operating frequency and the width of the duct section across which the standing wave field is formed.

Each of the outlet passages 32,34,36 is preferably provided with a valve (indicated diagrammatically at V for one of the passages 36). For the passages 32, for example, when the corresponding valves are closed, no fluid can pass through those outlet passages, therefore the entire fluid flow continues along the duct 30 without the transverse expansion described above. By progressively opening the valves for the passages 32, a progressively higher proportion of the fluid is able to leave the duct 30. In this way, the valve on each outlet passage can be used to control the separation of fluid from the particles. Alternatively, each outlet passage may be provided with a pump of independently-variable flow rate, again so that the separation process can be controlled.

The fluid and particles which remain in the duct 30 may be subjected to a second stage of separation, to further enhance the particle content (or alternatively maximize the fluid separated from the particles).

Where desired, the duct 30 may include an expansion section between the section in which the standing wave field is established and the section (shown in FIG. 3) which is provided with the outwardly-inclined outlet passages. This expansion section (corresponding to the expansion section 16 shown in FIG. 1) provides some separation of the particle bands, enabling observation of these prior to entry into the section of the duct shown in FIG. 3.

It will be appreciated that the invention may be used in a wide variety of applications, using a wide variety of different particles or microparticles (including biological cells) in appropriate fluids.

What is claimed is:

1. An apparatus for performing the manipulation of particles suspended in a fluid, the apparatus comprising:
   a) a duct for the flow of a fluid in which particles are suspended, said duct including first and second elongate sections, and an expansion in width therebetween;
   b) an ultrasonic transducer positioned on one side of said duct; and
   c) a reflector positioned on the opposite side of said duct, said ultrasonic transducer and said reflector establishing an acoustic standing wave field across a width of said duct such that said particles are concentrated into at least one planar band parallel to the longitudinal axis of said duct, said expansion of said duct being located downstream of said acoustic standing wave field,
   wherein laminar flow is established in said first elongate section before said fluid enters the acoustic standing wave field, and said second elongate section is provided downstream of said expansion and said laminar flow is maintained therein.

2. An apparatus as claimed in claim 1, in which said expansion of the duct is formed by a section of the duct which progressively increases in width over the length of that section.

3. An apparatus as claimed in claim 1, in which said duct is formed with at least one outlet passage which extends outwardly at an inclined angle, thus forming said expansion in width of the duct.

4. An apparatus as claimed in claim 3, comprising a plurality of said outlet passages spaced apart along said duct.

5. An apparatus as claimed in claim 1, further comprising a means downstream of said expansion for observing said bands into which said particles are formed.

6. An apparatus as claimed in claim 3, in which said outlet passage is provided with a valve for controlling the flow of fluid through said passage.

7. An apparatus as claimed in claim 3, in which said outlet passage is provided with a pump of adjustable flow rate.

8. A method of performing the manipulation of particles suspended in a fluid, the method comprising:

a) causing the fluid to flow along an elongate flow duct;

b) establishing a laminar flow of said flow duct;

c) after said laminar flow is established, establishing an accoustic standing wave field transversely of said duct, such that said particles are concentrated into at least one planar band parallel to the longitudinal axis of said duct;

d) providing a widthwise expansion of a stream of fluid downstream of said acoustic standing wave field, said expansion being in a direction parallel to said acoustic standing wave field; and e) maintaining said laminar flow of said fluid along a section of said flow duct downstream of said widthwise expansion.

9. A method as claimed in claim 8, further comprising the step of observing the fluid flow at a position downstream of said widthwise expansion.

10. A method as claimed in claim 8, further comprising the step of separating said particles from said duct at a position downstream of said widthwise expansion.

11. A method as claimed in claim 8, in which said duct is formed with an outwardly-inclined outlet passage which provides said widthwise expansion, and further comprising the step of controlling one of a valve and a pump in said outlet passage to control said expansion of said fluid.

* * * * *